United States Patent [19]

Weisstein

[11] 4,405,920

[45] Sep. 20, 1983

[54] ENHANCING THE PERCEPTIBILITY OF BARELY PERCEPTIBLE IMAGES

[76] Inventor: Naomi Weisstein, 407 Bleeker St., New York, N.Y. 10014

[21] Appl. No.: 221,849

[22] Filed: Dec. 31, 1980

[51] Int. Cl.$^3$ .............................................. G09G 3/00
[52] U.S. Cl. .................................. 340/700; 340/723; 340/791; 351/201; 351/237
[58] Field of Search ............... 340/725, 734, 700, 709, 340/723, 791, 792; 351/201, 237–243; 356/71, 23, 391–393; 350/144

[56] References Cited

U.S. PATENT DOCUMENTS

| | | | |
|---|---|---|---|
| 2,387,442 | 10/1945 | Hamilton | 351/201 |
| 3,739,347 | 6/1973 | Forsberg | 340/709 |
| 3,821,730 | 6/1974 | Carey et al. | 340/791 |
| 3,883,234 | 5/1975 | Lynn et al. | 351/243 |
| 3,967,266 | 6/1976 | Roy | 340/709 |
| 3,992,087 | 11/1976 | Flom | 351/237 |
| 4,012,128 | 3/1977 | Regan | 351/243 |
| 4,135,502 | 1/1979 | Peck | 351/240 |
| 4,293,200 | 10/1981 | Dobson | 351/239 |
| 4,295,135 | 10/1981 | Sukonick | 340/734 |
| 4,296,930 | 10/1981 | Fredericksen | 340/725 |

OTHER PUBLICATIONS

N. Weisstein and C. S. Harris, *Science*, vol. 186, pp. 752–755 (Nov. 22, 1974).

*Primary Examiner*—Marshall M. Curtis
*Attorney, Agent, or Firm*—Pennie & Edmonds

[57] ABSTRACT

Pictures, images, etc., in which a pattern or object to be observed is obscured by "noise", such as certain pictures or images obtained by video transmissions, aerial, X-ray or fluorescent photography or ultrasonic or similar techniques, are given dramatically greater perceptibility by imparting dynamics, or apparent activity and/or apparent motion, to the picture or to parts of the picture. This is accomplished by exhibiting the picture or parts of the picture in flashes of light at a rate of about 0.2 to 10 Hz, or by imparting motion to the picture or to selected elements within the picture at a corresponding velocity, or by flashing a sequence of slightly different pictures or different versions of the same picture within a corresponding cycle duration. The perceptibility is further improved by adding certain auxiliary lines or patterns either to the stationary picture or to some of the pictures in the sequence of pictures.

11 Claims, 11 Drawing Figures

ENHANCING THE PERCEPTIBILITY OF BARELY PERCEPTIBLE IMAGES

FIELD OF THE INVENTION

This invention relates to a process and apparatus for enhancing the perceptibility of barely perceptible images,—including small line segments or fragments of patterns as well as small or large complete patterns—which are at least partly concealed in a noisy (interfering) field, or are barely visible or hard to identify because their contrast is weak, or because other pattern details can be confused with the one of interest to the observer, or because they are visible only for brief durations. Examples of such picture details are those in computer graphic displays, oscilloscope images, radiographs, fluorescent photographs, sonograms, tumors on X-ray films, military targets in aerial photographs or viewed in real time, video transmissions, anomalous tracings in EEG and EKG recordings, photocopy and phone line transmissions, real world scenes, and formants in speech spectrograms.

PRIOR ART

The invention is related to the subject which has been made known by the inventor in the field of psychology as "object superiority" which in turn is analogous to "word superiority." It has been found, for example, that a human observer can better identify a letter which has been briefly flashed on a screen if the letter is part of a pronounceable word that if the letter is flashed by itself or as part of an unpronounceable string of letters. This phenomenon has been called "word superiority." Similar to "word superiority," the inventor and her collaborator found that observers identified a briefly-flashed line segment more accurately when certain auxiliary lines were added to it, even though extra lines had previously been thought only to decrease accuracy in detecting a small line segment because of reduced signal-to-noise ratio. This finding was named "object-superiority" because the configuration of auxiliary lines that increased accuracy yielded the distinctive perception of a unitary, three-dimensional object (see Naomi Weisstein and Charles S. Harris, "Visual Detection of Line Segments: An Object-Superiority Effect," *Science*, November 1974, Volume 186, pp. 752–755). Other experts in the field of psychology using the same patterns as did Weisstein and Harris, have confirmed the original "object-superiority" effect. In the further study of this phenomenon I have found that an enormous range and variety of auxiliary lines added to the picture will increase accuracy for selected picture details especially when those auxiliary lines increase the impression that the selected details are meaningful, familiar, geometrically regular, symmetrical, three-dimensional, or the like. Nevertheless, there are limits to the degree of enhancement achievable with auxiliary lines, and there is a distinct need for additional enhancement with many different types of images.

SUMMARY OF THE INVENTION

The present invention is based partly on the discovery that dramatic enhancement of perceptibility of a picture detail both absolutely and relative to the rest of the image is obtained if apparent activity and/or apparent motion is imparted to the totality of the image or to part of the image with respect to other parts. Surprisingly, the addition of "noise" in this fashion in accordance with the invention enhances the perceived signal-to-noise ratio of the image and hence facilitates recognition. The apparent activity and/or apparent motion may be accomplished in the following ways or combination of ways:

(1) by alternately illuminating and darkening the visual field at a frequency of about 0.2 to 10 Hz with a maximal sensitivity at about 1 to 4 Hz. This produces an impression of a flickering image.

(2) by presenting a sequence of slightly different images or of different versions of the same image with a frequency of 0.2 to 10 Hz. Here again, maximal sensitivity is at a frequency of 1 to 4 Hz. The rate of movement can also be defined by the linear velocity of the image as projected on the retina, in which case the desired velocity is between about 0.5° and 10° per second, preferably between about 1.5° and 4° per second.

(3) by moving the image, or certain parts of the image with respect to other parts of the image, at a velocity of about 0.5° to 10° visual angle per second, (which corresponds to a temporal frequency of about 0.2 to 10 Hz) with maximal sensitivity at about 1.5° to 4° per second (corresponding to about 1 to 4 Hz.). This produces apparent motion of the image, or of parts of the image with respect to other parts.

When one or more of these or analogous processes are applied to the picture, its meaningful portions (in the sense of patterns that appear three-dimensional or otherwise have some recognizable meaning to the observer, for example a utilitarian article or a geometric form, as distinguished from those having no recognizable meaning) stand out in depth and clarity while its less meaningful portions become less perceptible or diminish to a uniformly "snowy" or noisy and/or grayish background.

When the picture detail itself is not three-dimensional, or familiar, or otherwise meaningful, the effect can be further enhanced by making it appear three-dimensional, or familiar, or otherwise meaningful in the senses described previously.

These methods may be carried out in accordance with the invention in numerous ways depending on the form of the image to be enhanced, the equipment available and the rapidity of processing desired. For example, an image on a CRT may be varied by repetitive blanking of the whole image or by repetitively increasing and/or decreasing the brightness of individual elements or portions of the image. The rate of change preferably corresponds to a temporal frequency of about 0.2 to 10 Hz or, equivalently, to a cycle period of 5 sec. to 100 msec. The illumination can be varied sinusoidally or by a square wave or ramp function; the precise waveform is not critical. It can conveniently be supplied internally to the display device, e.g., by voltage variations to a CRT, or, if the CRT is digitally controlled, by voltage variations to each picture element on a CRT display. These voltage variations may be such that all the elements in the image will alternately lighten and darken together and the apparent activity will be an impression of flickering; or they may be such that individual picture elements will change intensity (brightness) or shade independently of other picture elements and the impression will be one not only of flicker but also of apparent motion of some picture elements in the image relative to others, and/or of the whole image in motion. Alternatively, the objectives of the invention can be accomplished by maintaining a steady light source but changing the images, for example by presenting a sequence of positive and/or negative transparencies in a film loop in a motion picture projector, or flashing the sequence of positive and/or negative transparencies in a multiple channel optical system. The image may be further enhanced in many cases by the addition of line segments, perspective frames, or geometric figures to the field or fields of the noisy images, or by imparting motion to the elements of the image, or portions of them, in a geometrical or otherwise meaningful pattern.

Depending on the nature of the object to be enhanced, it may be referred to in this specification as a pattern detail, picture, picture detail, part of a picture, or an image.

While it is desired not to be limited to any theory of why the process works, the experiments lead me to believe that low-level details in an image are filtered, enhanced, and/or overriden by higher-level processes, that is, processes in the brain that interpret visual stimulation. Information from these high-level interpretations in the brain is fed back to influence the timing and sensitivity of low-level mechanisms in the eye and the subcortical structures. This results in a distinctive visual response to meaningful patterns such as those described above. The neural basis of response involves an amplification of firing of individual nerve cells, and an alternation in their timing. In addition, neural impulses "spread out" over a wide region of the brain—that is, many additional nerve cells participate in the response—so as to complete a pattern that appears partially occluded or behind another pattern. They also "spread out" over time so that visual information from a sequence of images is integrated into a meaningful picture. Also, it is likely that the flickering stimulates the nerve cells that respond primarily to motion, and conversely that motion stimulates the nerve cells that respond to flicker. The perception of motion often accompanies flickering, and the impression that contours are moving can contribute to the enhanced perceptibility of the contours.

The addition to an image of apparent activity and apparent motion as disclosed herein capitalize on the inventor's discovery that the timing of visual response changes when patterns are made to make sense to an observer. For example, it has been found that the visual response to a line segment that appears three-dimensional is faster than when that same line segment appears flat, see Weisstein and Maguire, "Computing the Next Step: Psychophysical Measures of Representation and Interpretation," Computer Vision Systems, Hanson and Riseman, Academic Press, New York, 1978. If the visual response to a pattern is fast, then the pattern will still be visible when subjected to a relatively rapid rate of flickering illumination, since the fast response can keep up with the fast rate of flicker. If the visual response to a pattern is slow, then the pattern will not be visible when subjected to a rapid rate of flickering illumination, since the slow visual response cannot keep up with the rapid rate of flicker. Similarly, if the visual response to a pattern is fast, motion between meaningful regions and contours is picked up at velocities at which motion between less meaningful elements no longer reaches the perceptual threshold, and the integration over time of meaningful information from slightly different pictures occurs at a rate and for a duration at which integration of less meaningful portions of the picture no longer occurs. Thus, flickering, sequencing, and/or moving images at a relatively rapid rate will enhance the perceptibility of the patterns to which visual response is fast—for example, patterns that appear three-dimensional—whereas these same processes will diminish to the point of their disappearance the perceptibility of patterns to which visual response is slow—in this same example, flatter patterns.

The sequencing, flicker and motion processes can thus be said to comprise a "filter" whereby, for a single pattern or for sequences of slightly different patterns, by choosing the appropriate rate of flicker, velocity of motion, and/or frame rate for sequencing the images, and, if necessary, by adding appropriate auxiliary lines to make the image or portions of the image three-dimensional or otherwise visually meaningful, a desired picture detail or class of picture details is brought into view, while picture details not in that class are suppressed from view. When noisy auxiliary images are added over time at a certain rate, the visual system will combine in motion the portions of each image that contribute to a meaningful picture.

The present invention differs from all other techniques of image enhancement in that in the techniques currently in use, machines or computers are employed to enhance and clarify the image before it is presented to the visual system. This invention, instead, takes the image as it is, and employs techniques that enable the visual system itself to better utilize its powerful internal sensory mechanisms for clarifying and enhancing images. Unlike other techniques, then, with this invention, the image enhancement process occurs "inside the head".

DESCRIPTION OF THE DRAWINGS

For a better understanding of the nature, scope and characteristic features of the invention, reference is now made to the following description and accompanying drawing, in which.

PREFERRED EMBODIMENTS OF THE INVENTION

Figure 1:
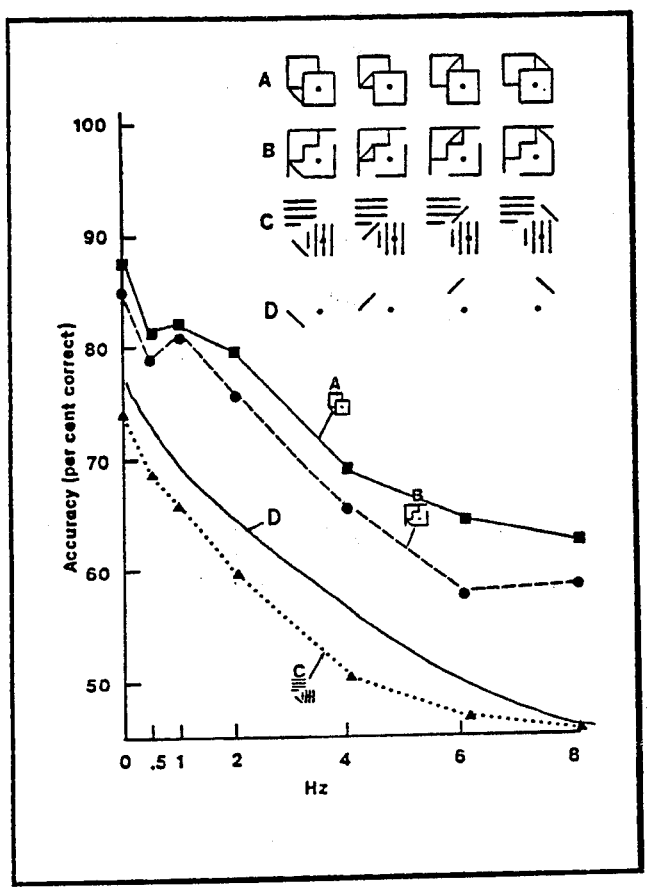
FIG. 1 is a graphical illustration of one of the results of the invention specifically for the process of applying flickering illumination.

FIG. 1 shows the accuracy of recognition of a small diagonal line segment when it is presented alone, or with auxiliary lines that do or do not increase its visual meaning, under continuous illumination and under varying rates of flicker.

FIG. 1 reflects the results of an experiment in which subjects were asked to judge which of the four target lines D were presented in each briefly viewed display.

Each data point shown is a mean, averaged over five subjects and the four target line positions. At the zero-frequency axis, i.e., under continuous illumination, about 77% recognition was achieved. Where a meaningless pattern of auxiliary lines was added (C), recognition dropped to about 74%, whereas addition of meaningful patterns (A and B) increased recognition to about 88% and 86%, respectively. This demonstrates the prior-art "object superiority" effect described above.

When flicker was imposed on the displays, absolute accuracy of recognition decreased in all cases. Suprisingly, however, recognition of meaningful patterns relative to non-meaningful patterns (i.e., the vertical distance between the respective curves) increased; that is, the signal-to-noise ratio was increased, at flicker rates between about 0.5–10 Hz.

At 28 Hz, the illumination appears steady, although at about half the brightness of the continuously illuminated field. As the rate varies from 0.5 to about 2 Hz, accuracy for the line segment in the meaningless pattern (C) or alone (D) steadily and severely declines, while accuracy for the line segment that has been made to appear meaningful remains high. In some cases, although not in this particular experiment, it is even enhanced over accuracy at continuous illumination. At higher flicker rates, absolute accuracy drops rapidly for all patterns. Thus, even though accuracy of the image in a meaningful context is enhanced relative to that for non-meaningful context at higher flicker rates, the perceptual advantage obtained decreases due to the drop in absolute accuracy for all patterns.

Figure 8:
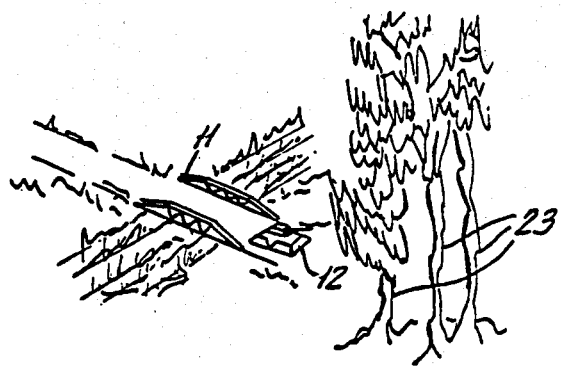
Figure 9:
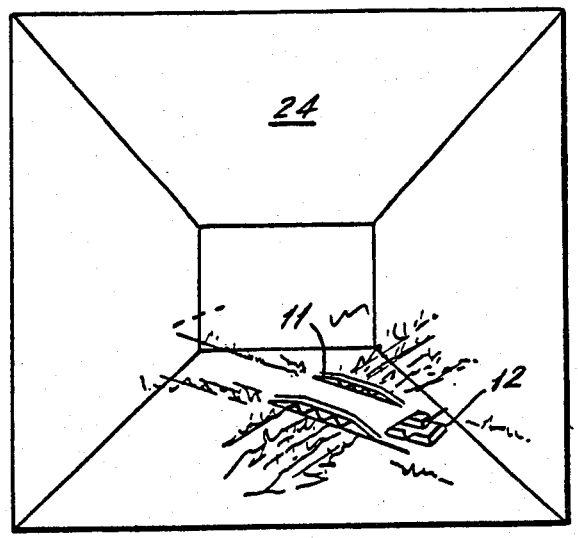

Thus, a picture detail can, upon application of apparent activity and/or motion, be made to stand out of a noisy or barely visible picture. The example just discussed illustrates one such apparent activity—flickering illumination. If the picture detail is already partially or wholly meaningful in any of the senses referred to above, flickering the picture at an optimal rate will enhance it. It has been found that the optimal rate varies for each image (within the range of 0.2–10 Hz) and can best be obtained by trial and error. If the picture detail is not already visually meaningful, or if it is only partially visually meaningful, context in the form of auxiliary lines or other recognizable patterns can make the picture detail look more visually meaningful by, for example, increasing its apparent depth (FIGS. 5–7 and 9, or by increasing the familiarity of the scene in which it appears (FIG. 8). Then, flickering the picture will bring it out. The addition of the auxiliary lines will by itself increase the visibility of the picture detail; flickering the picture will then further increase its visibility.

An alternative means of producing activity and/or motion in the pattern or pattern detail involves using sequences of slightly different images. This adds not only motion and flickering, but it also adds versions of an image over time, each of which can contribute information that makes the picture detail more visually meaningful. The sequence of images can consist, for example, of the image with different auxiliary lines added to each subsequent image (see, e.g. FIGS. 5–7), or they can consist of a sequence of slightly different versions of the same image such as would occur if it were photographed from different angles, or with different light-dark contrast, so as to produce motion or highlighting of contours. For example, one could take a sequence of aerial reconnaissance photographs of the same installation photographed at different altitudes, seasons, days or even years and process them together in a film loop so that they can be exhibited in a motion picture projector. Alternatively, these same photographs can be presented in repeating sequence in a multiple channel optical system, such as the one described below.

Figure 2:
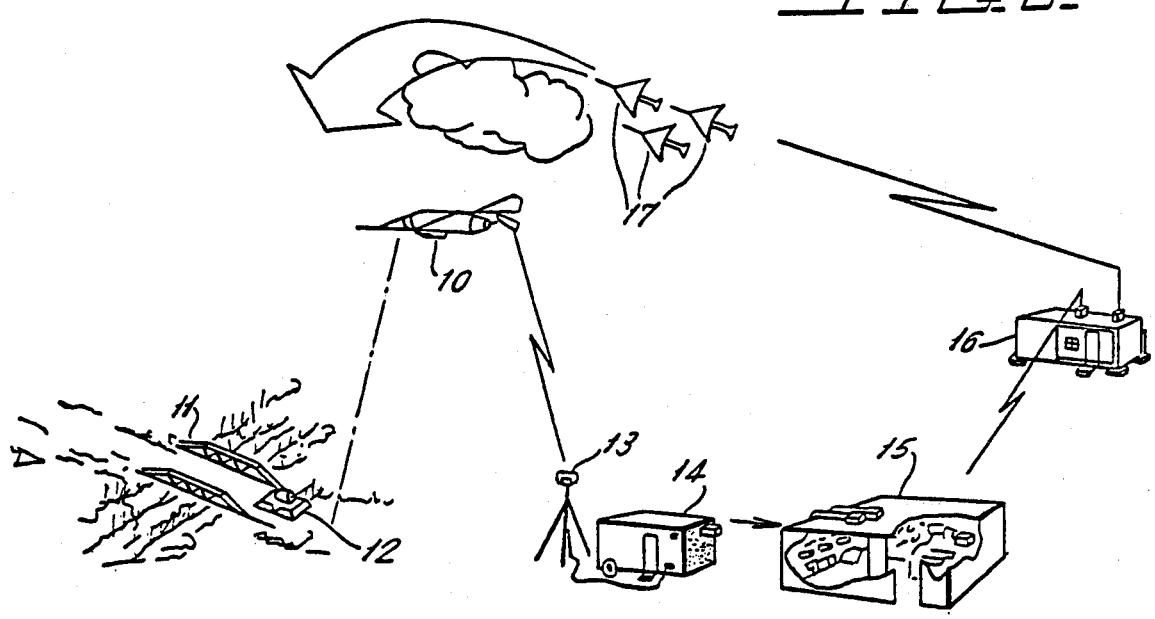
FIG. 2 is a schematic view of an aerial reconnaissance system to which the invention is applicable.
Figure 3:
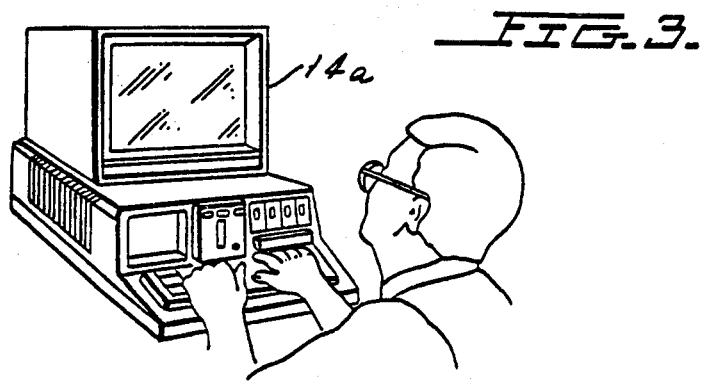
FIG. 3 is a detail view of an operator receiving video information in the system of FIG. 2.

Such sequences of slightly different images can also readily be produced by a computer-controlled video system, such as the one illustrated in FIG. 2, unit 14. FIG. 3 illustrates an operator monitoring the video display 14a of video system 14.

Figure 4:
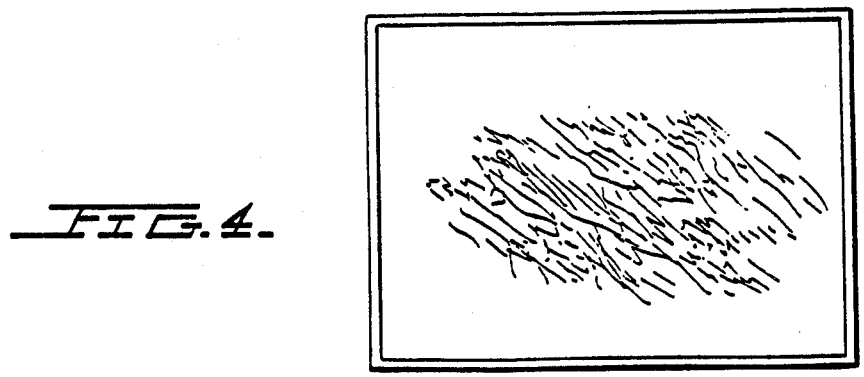
FIG. 4 is a picture, on a video monitor, from the system of FIG. 2 illustrating how details of the picture are obscured by noise.

In the system illustrated in FIG. 2, a reconnaissance plane 10 is photographing or televising a scene containing a bridge 11 and tank 12. The signals representing the scene are transmitted to antenna 13, processed in computer-controlled video unit 14. Information from unit 14 is fed to and manipulated by computer 15. Signals from computer 15 are sent to transceiver 16 which transmits information to aircraft 17. Within the unit 14 an operator sees the video transmission of plane 10 on the video monitor 14a. The picture usually contains much noise from both internal and external sources and the target area can be obscured as illustrated in FIG. 4. For example, the sequence of aerial reconnaissance photographs being transmitted from the reconnaissance plane 10 in FIG. 2 can be, and which often appear very noisy, as illustrated in FIG. 4, stored and presented at a specified frame rate in accordance with the invention. Additionally, they may be presented in a particular sequence chosen to maximize motion and flickering of the meaningful parts of the image or the parts of the image to be spotted.

Another example of a sequence of slightly different images, this time specifically designed to produce motion of some of the elements in the picture and thereby enhance these elements, is the following. If it is desired to additionally enhance perception of the tank 12 in FIG. 2, or to initially detect these tanks in FIG. 4, motion can be added to all individual picture elements that have the same shade of gray, or the same color, or any other common property readily addressable by the computer. Importantly, the set of picture elements selected for this purpose need not bear any relationship to the image to be enhanced; i.e., no knowledge of the particular image is needed to select a mode for its enhancement. A gray scale range, or color, can readily be selected for processing by the computer apart from the remainder of the image, and that is the reason for choosing it. The added motion of the selected elements can be, for example, horizontal or oscillatory across the picture plane, or it can simulate a rotation around the x-axis or y-axis of the picture plane. This may be done by adding the gray scale value of the areas to be moved, to the existing gray scale value of the picture at each point (sequentially) along the line of motion for the area. The elements of the rest of the picture remain stationary. Such motion, which for example may be oscillatory or continuous (in a loop) in any direction, will not only produce enhancement per se, but, additionally, will lead to a strong impression of depth for the elements in motion, and, as with auxiliary lines (context) that add depth to picture details, will further enhance perception of these elements.

Figure 5:
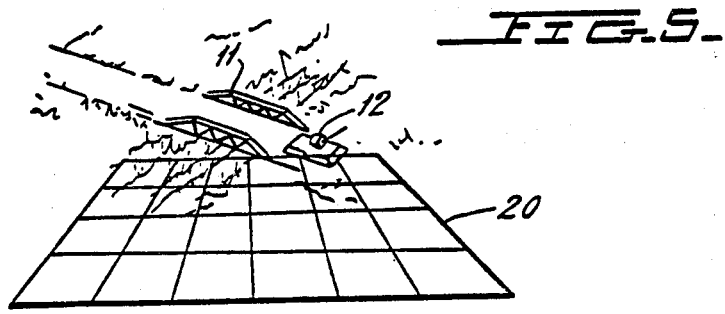
FIGS. 5, 6, 7, 8 and 9 are illustrations of additional auxiliary lines or geometric figures which have been added to the picture and can enhance perception of the details thereof.
Figure 6:
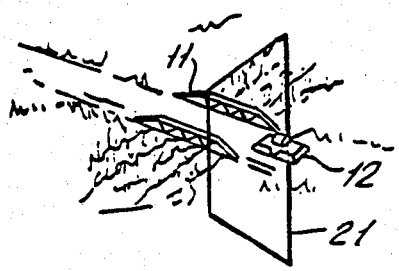
Figure 7:
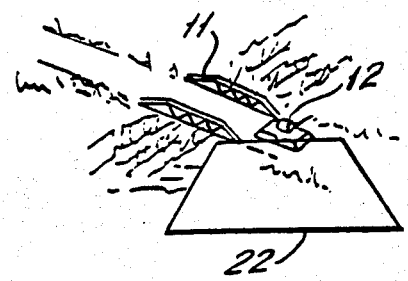

The addition of context, illustrated in FIGS. 5 to 9, can produce additional enhancement of the details. In FIG. 5 a grid structure 20 has been added; in FIGS. 6 and 7 a trapezoidal FIG. 21 or 22 has been added; in FIG. 8 a group of trees 23, and in FIG. 9 a perspective frame 24 has been added.

The foregoing methods are especially useful when the aerial reconnaissance photographs are taken at such altitudes that the objects to be spotted do not have pictorial visual meaning, and appear merely as a cluster of tiny, dot-like elements. While the addition of static auxiliary patterns (context) can give these dot-like elements individual pictorial visual meaning to some extent, the addition of a dynamic process of motion or flicker in accordance with the invention that brings all the dot-like elements out in depth, gives them all general pictorial visual meaning, and this is generally more effective for enhancement. Maximum benefit can be obtained in accordance with the invention by superimposing dynamic enhancement on top of the previously known static enhancement.

Another example in which the same type of motion would be effective is the detection and identification on an X-ray film of spots, masses, or areas that might indicate malignancy. Here again, moving all the elements in the picture that are the same shade, or within a given gray scale range, relative to the rest of the picture will cause these elements to stand out in depth, and thus dramatically enhance perception. An equally effective method in accordance with the invention would be to impart relative motion to all image components or features in a certain size range, or of a certain geometry, or angular orientation, depending on the particular image involved. Selection of those elements to be moved or flickered may be made on the basis of ease of selection and definition of the components by the particular computer employed; it need not be based on any foreknowledge of what parts of the image are important. In some cases, the same effect might be achieved with high-contrast photographic film, for example by exposing the image on such film so as to obliterate all gray tone either above or below an arbitrary value, and then moving the resulting image relative to the original image.

Applying one or more of these processes will lead to a procedure in which essentially only picture details critical to a particular application (together with the meaningful parts of the pattern in which they appear) are rendered visible while the rest of the picture is suppressed so that it looks like a uniformly grainy, gray, or "snowy" background. The process can therefore result in the detection and identification of picture details, small patterns, and objects in noisy images where such detection and identification is otherwise impossible or subject to a large number of errors and/or is costly and time-consuming. In general, these processes require no precise knowledge of where the picture details are, so long as they are in the field of view, or of their precise shape or configuration.

The details of FIG. 4 can also be made to stand out by a sequencing process in which individual picture areas of any arbitrary size are varied in light value independently of (and not necessarily in phase with) other picture areas, with individual flashing or sequencing rates of approximately 0.2 to 10 Hz.

Figure 10:
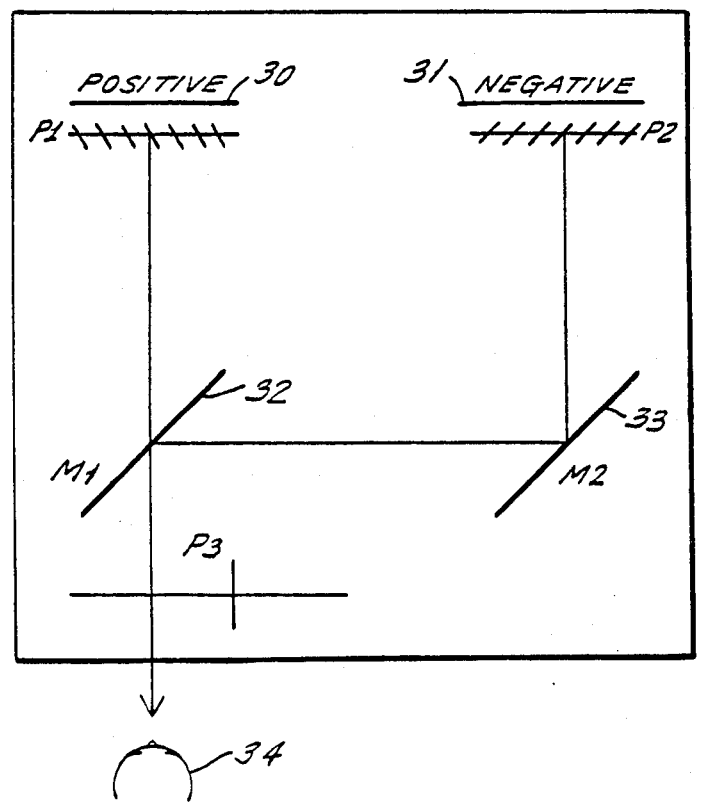
FIG. 10 illustrates a modified method and the apparatus therefor.

If a picture similar to that on the video monitor 14A has been developed and printed, a similar effect of bringing out the details of the picture to an observer can be obtained by simple electronic and optical means such as by illuminating it with a strobe light or interposing a rotating shutter between a constant light source and the image or between the observer and the image at a flicker rate of 0.2 to 10 Hz. One means of producing the flickering is by means of two or more polarizing films, one of which is rotated at the required speed of 0.2 to 10 cycles per second. FIG. 10 illustrates such a method as well as a modified form of the same method. When the picture to be examined is available both as a positive and negative transparency, the flickering may be obtained by alternately viewing the positive and negative at the required rate of 0.2 to 10 Hz. Thus, FIG. 10 shows a positive transparency 30, and a negative transparency 31, both of which may be illuminated by daylight or light bulbs, not shown. In front of positive 30 is a polarizing film P-1 and in front of negative 31 is an orthogonally polarizing film P-2, i.e., the films P-1 and P-2 have their polarizing axes oriented at 90° with respect to each other. Light from positive 30 passes through a half-silvered mirror 32 to the rotating polarizing film P-3. Light from negative 31 which passes through P-2 is reflected by angle mirror 33 (which may be a prism) to mirror 32 and is reflected to P-3. When P-3 is rotated at 0.2 to 10 cycles per second, the viewer at 34 ultimately sees the positive and negative images from 30 and 31, i.e., all points in the image are perceived to vary from their gray scale value in the positive to that in the negative.

Alternatively, the mirror 32 and 33 and the negative 31 and P-2 may be omitted so that the entire image flickers uniformly. For further enhancement by imparting motion in addition to the flickering, two positives slightly out of register, or slightly different from each other, may be substituted for the positive and negative shown in FIG. 10. For presenting sequences of more than two slightly different pictures, additional light sources, mirrors, and shutters can be positioned in accordance with FIG. 10 so that further channels are introduced.

Figure 11:
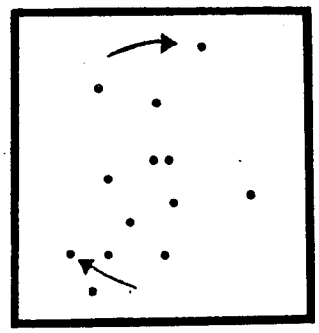
FIG. 11 illustrates a video display of a dot pattern and its enhancement.

FIG. 11 illustrates an embodiment of the invention for enhancing the perceptability of a pattern by imparting motion to convey an illusion of depth. A field of dots of varying brightness is shown, and it is desired to select the brightest one. The same method is applicable to select the longest or widest of a field of lines. The field is displayed on a video-controlled computer (such as a Grinnel Video Image Processing System controlled by a DEC PDP-11-23 computer), which is programmed to move the dot pattern such that they appear to be rotating inside of a transparent sphere.

Without rotation, an experiment was conducted in which observers were given six seconds to spot the brightest dot. The accuracy of observation was about 64%. When the dot display was rotated, giving rise to a compelling illusion of depth, the accuracy rose to about 96%. The rotation velocity of the sphere was adjusted to provide a velocity of about two degrees of visual angle per second in this test.

Although the invention has been described with particular attention to real world scenes such as reconnaissance photographs, it is equally applicable to any other type of photograph or video or CRT image or the like where noise is a considerable factor in obscuring important details of the picture, such as in a low contrast image, including X-ray photography, computer graphic displays, fluorescent photographs, images taken by ultrasonic techniques, underwater photographs and the like.

It will be apparent to those skilled in the art that the specific embodiments of the invention described herein may be modified without departing from the scope and spirit of the invention, which is to be limited only in accordance with the following claims.

I claim:

1. A method of enhancing the perceptibility to an observer of a target image in the presence of a noise image, the target image and the noise image forming a composite image, the noise image rendering the target image substantially unrecognizable when the composite image is viewed statically, the method comprising: (a) positioning the composite image to be viewable by an observer, and (b) repetitively exhibiting and obscuring at least a portion of the composite image at a frequency in the range of from about 0.2 to about 10 hz, the portion of the composite image repetitively exhibited and obscured including elements of the target image and elements of the noise image, whereby the perceptibility of the target image to the observer is enhanced.

2. A method as defined in claim 1 in which the at least a portion of the composite image is repeatedly illuminated at a frequency in the range of from about 0.2 to about 10 hz.

3. A method as defined in claim 2 in which a strobe light repeatedly illuminates the at least a portion of the composite image.

4. A method as defined in claim 1 further comprising superimposing a visually recognizable pattern on the at least a portion of the composite image.

5. A method as defined in claim 1 in which the composite image is displayed on a video display, the at least a portion of the composite image being caused to become alternately brighter and darker at a frequency in the range of from about 0.2 to about 10 hz.

6. A method of enhancing the perceptibility to an observer of a target image in the presence of a noise image, the target image and the noise image forming a composite image, the noise image rendering the target image substantially unrecognizable when the composite image is viewed statically, the method comprising: (a) positioning the composite image to be viewable by an observer, and (b) imparting motion to at least a portion of the composite image at a velocity such that a visual angle subtended by the composite image portion at the eyes of the observer changes at a rate in the range of from about 0.5 to about 10 degrees per second, the portion of the composite image so moved including elements of the target image and elements of the noise image, whereby the perceptibility of the target image to the observer is enhanced.

7. A method as defined in claim 6 in which at least one additional image which is slightly different from the at least a portion of the composite image is provided and the additional image and the at least a portion of the original composite image are repetitively displayed in a sequence at a frequency in the range of from about 0.2 to about 10 hz.

8. A method as defined in claim 6 in which the at least a portion of the composite image and substantially the same image portion slightly displaced from the original image portion are alternately displayed at a frequency in the range of from about 0.2 to about 10 hz.

9. A method as defined in claim 6 in which a first portion of the composite image incuding elements of the target image and elements of the noise image is moved with respect to a second portion of the composite image at a relative linear velocity corresponding to a change of visual angle at the eyes of the observer at a rate in the range of from about 0.5 to about 10 degrees per second.

10. A method as defined in claim 6 in which the at least a portion of the composite image is moved along an apparent geometrical surface.

11. The method as defined in claim 6 in which the visual angle subtended by the at least a portion of the composite image at the eyes of the observer changes at a rate in the range of from about 1.5 to about 4 degrees per second.

* * * * *